INVENTOR
Edmond Henri Victor Noaillon
BY
ATTORNEY

Aug. 12, 1930.    E. H. V. NOAILLON    1,772,782
ART OF MAKING CINEMATOGRAPHIC PROJECTIONS
Filed Dec. 18, 1928    3 Sheets-Sheet 2
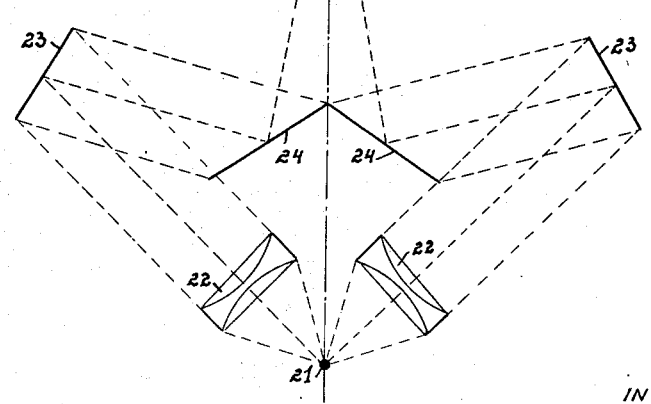
INVENTOR
Edmond Henri Victor Noaillon
BY
ATTORNEY Aug. 12, 1930.  E. H. V. NOAILLON  1,772,782
ART OF MAKING CINEMATOGRAPHIC PROJECTIONS
Filed Dec. 18, 1928   3 Sheets-Sheet 3
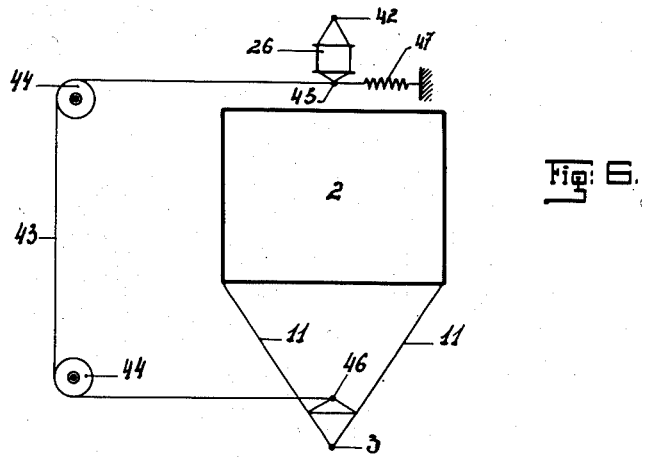
Fig. 6.
Fig. 7
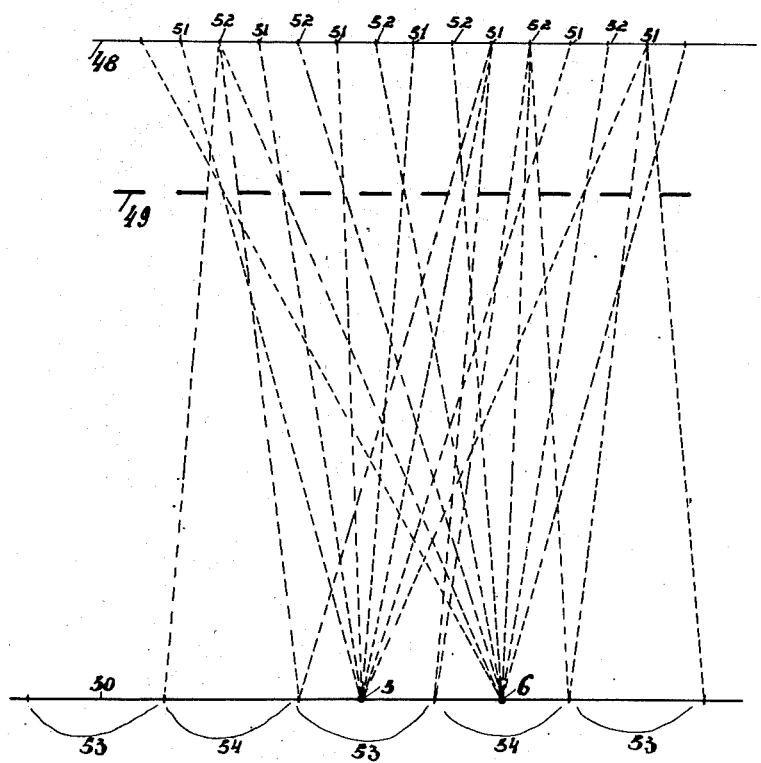
INVENTOR Edmond H. V. Noaillon.  By Victor D. Borst ATTORNEY Patented Aug. 12, 1930

1,772,782

UNITED STATES PATENT OFFICE

EDMOND HENRI VICTOR NOAILLON, OF BRUSSELS, BELGIUM

ART OF MAKING CINEMATOGRAPHIC PROJECTIONS

Application filed December 18, 1928, Serial No. 326,867, and in Belgium December 27, 1927.

This invention relates to improvements in the art of making cinematographic projections. It has for its object to secure stereoscopic projections by means of two projection apparatus working synchronically, one apparatus projecting the picture to be seen by the right eye of the spectator and the other apparatus projecting the one to be seen by the left eye, the stereoscopic vision being secured without the necessity for the spectator of providing his eyes with any auxiliary apparatus.

With this object in view the invention essentially consists in the special arrangements and combinations of parts and apparatus as hereinafter fully described and pointed out in the appended claims.

Referring to the annexed drawings which show, as an example, one embodiment of the invention.

Figure 3 shows also, diagrammatically but at a still enlarged scale the detail of the arrangement of the projection apparatus which is shown at 4 in Figures 1 and 2.

Figure 4 is a front view of a detail of the projection apparatus and Figure 5 a top view of the same detail.

Figure 6 illustrates diagrammatically the connection between the filter and micro-filter for synchronous operation thereof.

Figure 7 is a diagrammatic illustration of the relation of the filters.

In the arrangement shown in Figures 1 and 2, the hall A is provided as usually with a screen 1 in front of which is mounted a flat screen 2 which will be hereinafter called the "filter." This filter which will be described hereinafter more in detail is made of a plane surface pierced with a series of slits which preferably converge substantially towards a point 3 on which the filter is adapted to be moved, for instance oscillated in its own plane; this point 3 is situated on the line of intersection of the plane of the screen and of the plane of the filter.

Figure 1:
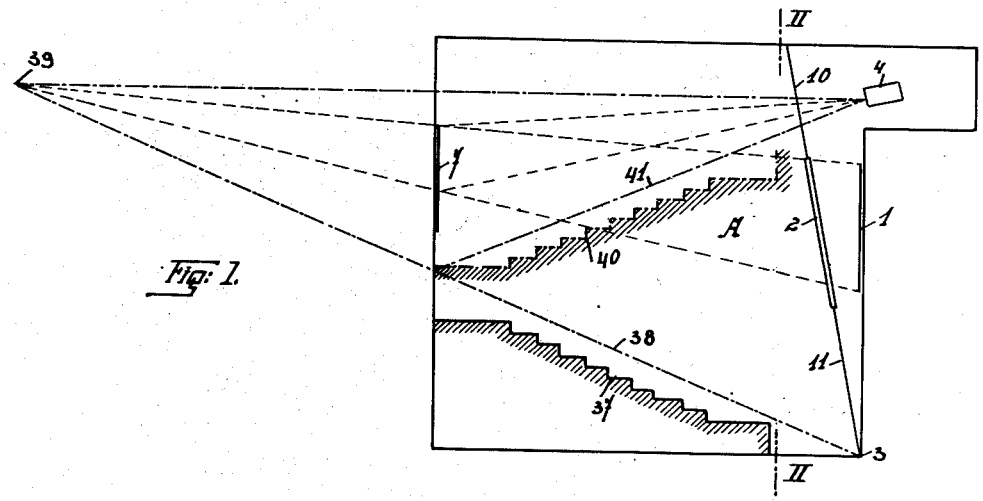
Figure 1 shows diagrammatically a vertical longitudinal section of a cinema hall provided with the necessary equipment to secure stereoscopic vision.
Figure 2:
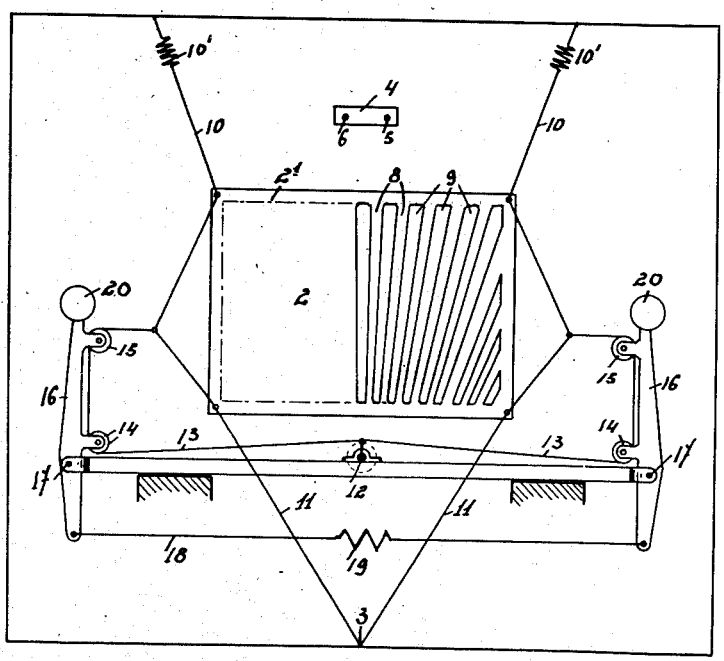
Figure 2 shows diagrammatically, on an enlarged scale a transverse section of the hall, the said section being taken on line II—II in Figure 1 and showing the arrangement of a part of the apparatus cooperating with the ordinary screen on which the pictures are projected.

4, in Figures 1 and 2, designs a double projector, shown separately on Figure 3, projecting on the screen 1, a double film of which each element comprises two juxtaposed stereoscopic pictures. The left hand picture and the right hand picture are projected simultaneously, the left hand picture issuing from the double projector 4 at the point 5 and the right hand picture at the point 6 of the projector (Figures 2 and 3).

The bundles of luminous rays issuing from the points 5 and 6 of the double projector 4 reach the screen 1, in the example shown, after having been reflected by a mirror 7 located in the hall on the wall opposite to the screen 1 and after their passage through the filter 2. This filter may be formed as an example of a metallic rectangular frame $2^1$ on which are fixed metal bands 8 preferably of black colour or other non-reflecting and opaque material which are arranged so as to converge substantially towards the point 3. These bands are spaced by slits 9, the central lines of which are spaced so as to intercept equal segments on a horizontal line; the edges of these slits are straight lines converging at the point 3.

In the example shown, the filter 2 is suspended from cables 10 in which springs $10^1$ are inserted. Other cables 11 connected to the lower angles of the frame $2^1$ and converging to the point 3 prevent any oscillation or movement of the filter other than its oscillation around the point 3. This oscillation is secured by aid of a crank 12 acting on two cables 13 which are connected to the filter after their passage on guiding pulleys 14 and 15. The said pulleys are mounted on two levers 16 which are pivoted on fixed points 17 and are connected to each other through a cable 18 provided with a spring 19 holding the whole system under tension. The levers 16 are fitted with weights 20 which balance the reactions of inertia of the whole system in such a manner that the oscillation of the filter does not cause any trepidation in the hall.

The double projector which is shown diagrammatically at 4 in Figures 1 and 2 and which is located above the screen 1 in the example shown, comprises, as shown in Figure 3, a source of light 21, the light of which is rendered parallel in two bundles by passing through two condensers 22. By means of plane mirrors 23 and 24 the two symmetrical bundles of parallel rays which are thus formed, and which are converging under a very acute angle, are thrown on a convex long focus lens 25.

Behind this lens 25 is mounted a plate of glass or other transparent material 26 hereinafter called the "microfilter" which is adapted to be moved or oscillated in its plane and which receives from the lens 25 the two bundles of slightly converging light rays. The microfilter 26 which is shown separately on an enlarged scale on Figures 4 and 5 consists, as already stated, of a glass plate having parallel faces, one of which is provided with concave grooves 27. These grooves preferably converge towards a given point which is the point around which the plate can be oscillated.

If a bundle 28 (Figure 5) of parallel or slightly converging rays is directed on one face of the glass-plate or microfilter, there will be formed on lines which are supposed to be projected at 29, in Figure 5 (that is to say at the focii of each of the small lenses which are formed by the cylindrico concave grooves 27) a virtual image having the shape of a line of light. These virtual lines or strips of light converge just like the grooves of the microfilter and oscillate around their converging point when the microfilter is oscillated. The line 30 on Figure 3 shows the plane containing the two series of virtual luminous lines which are produced by the two bundles of light which are directed on the microfilter 26 in the arrangement shown. After their passage through the microfilter 26, the two bundles of light are received by two double reflection prisms 31 which bring them together and make them parallel to each other. Behind these prisms are placed two lenses or optical systems 32 which are located at the focus of the lens 25 and which project two reduced true images of the virtual lines or strips of light 29 on a double film 33 which is displaced in front of reflection prisms 35, which are combined with objectives 34 cooperating with a second set of reflection prisms 36.

As a consequence of this special arrangement the objectives 34, by their cooperation with the reflection prisms 35 and 36 and with the mirror 7 project on the screen 1, the two pictures of each element of the double film 33 and, as these pictures are lighted only along substantially converging lines or strips on account of the presence of the microfilter 26, the projections of the said pictures on the screen are formed also by a multiplicity of converging lighted lines or strips.

As already stated, the microfilter must be moved or preferably oscillated in its own plane. This movement, in practice, may be mechanically produced by the movement of the filter 2 in such a manner that the movements of the filter and of the microfilter will be the same and take place synchronically as shown by way of example in Fig. 6.

As shown in Fig. 6, the micro-filter is oscillatable about the point 42 which is the point toward which the grooves 27 of the micro-filter converge. An elastic cable passing over the pulleys 44 is connected to the point 45 on the micro-filter and to the point 46 of the cables 11 which latter oscillate with the filter about the point 3. The spring 47 maintains the cable 43 under tension at all times.

The ratio of the distance between the points 3 and 46 and the points 45 and 42 is such that the angular movements of the filter and of the projection of the micro-filter are the same.

The position and action of the microfilter 26 must be controlled in such a manner that the luminous bundles formed by the lighted lines or strips of the pictures which are projected, will pass through the middle of the slits 9 in the filter 2 and reach the screen 1 without being interfered by the metal bands 8 of the filter. The projection of each picture on the screen 1 will consequently consists of a multiplicity of lighted or luminous lines or strips, oscillating on the point 3, each luminous line or strip of one picture being inserted between two adjacent luminous lines or strips of the other picture.

As shown diagrammatically on Figure 1, the spectators looking at the screen 1 are sitting on seats placed on steps 37 in such a manner that their eyes will be approximatively in the plane 38 passing through the intersection of the planes containing the screen 1 and the filter 2 and through the image 39 of the double projector 4 in the mirror 7.

Further on both sides of the hall, steps 40 may be placed on which spectators are looking at the mirror 7 in which they are seeing the image of the screen. The eyes of these spectators are then placed in the neighbourhood of the plane 41 which corresponds to the symmetrical plane of plane 38 relatively to the mirror 7.

The general arrangement of the screen, filter, microfilter and projectors just described acts as follows to secure the stereoscopic vision:

The double film 33 being projected by the double projector 4 as above described, is thrown, as already stated, in the shape of bundles of luminous lines or strips, on account of the action of the microfilter 26 on the mirror 7 through which it is reflected on the screen 1 after passing through the slits 9 of the filter 2 moving or oscillating synchronically with the microfilter 26.

In order to facilitate the understanding of the operation, it will be first supposed that the filter 2 and the microfilter 26 are maintained in a fixed position, the movement of both filter and microfilter being momentarily stopped, and that a blind is put before the point 6 of the projector in such a manner that only the left hand picture issuing from the point 5 will be thrown on the screen 1.

The lighted or luminous lines or strips composing this picture will then be thrown in the hall through the slits 9 of the filter 2 in the shape of bundles of diffused light which will trace on the planes 38 and 41 (if the said planes are supposed to be materialized) a series of lighted and lengthened triangles, having their acute apex at the point 3; these luminous triangles are separated by dark triangles. Now, if a spectator looking at the screen 1 with only one eye, has the said eye placed in a luminous triangle, he will see on the screen 1, the series of luminous lines or strips forming the left hand picture; should his eye be placed in a dark triangle, the screen would appear absolutely black. If then the filter 2 and the microfilter 26 are moved for instance oscillated synchronically at a suitable speed, the luminous triangles will remain stationary in the planes 38 and 41 and the spectator, whose eye is located in a luminous triangle will perceive, on looking at the screen, instead of a series of lines or strips, a continuous picture. However, as at the end of each oscillating movement of the filter 2, a short moment of stoppage takes place, the picture will appear provided with dark zones corresponding to the black portions of the filter in its two positions at the end of its stroke. To make these black lines or black portions disappear completely, it is sufficient to synchronize the forward movement or displacement of the film with the oscillations of the filter and to produce an occultation of the film at the end of each stroke of the filter.

If now, the blind which has been supposed to be placed before the point 6, is taken away, the two pictures will be thrown on the screen 1. There will consequently be formed on the planes 38 and 41 which are still supposed to be materialized, two alternating series of luminous triangles converging at the point 3; from one of these series, exclusively the left hand picture will be seen and from the other exclusively the right hand picture. Consequently if a spectator has his left eye located in a luminous triangle corresponding to the left hand picture and his right eye located in a luminous triangle corresponding to the right hand picture, he will have stereoscopic vision. Obviously the seats located on the steps 37 and on the steps 40 must be arranged in such a manner that their middle line pass through a separating line of the triangles of vision of the left hand and right hand picture in such a manner that the spectators will have their eyes suitably placed to secure the stereoscopic vision.

Let us consider in Figure 1 a plane passing through the point 39 (which is the image of the double projector 4 seen in the mirror 7) and meeting the filter and the screen according to horizontal lines.

Figure 7 shows this plane in which 5 and 6 are the points from which issue the two projections, the parallel lines 48, 49 and 50 being respectively the horizontal lines of intersection of this plane with the plane 1 of the screen, the plane 2 of the filter and the plane 38 of the eyes of the spectators.

The slits in the filter correspond to the spaces in the line 49; those spaces are equal and equidistant and moreover those spaces are equal to the full parts.

The point 5 projects on the screen through the slits of the filter, luminous rays 51 of the micro-filter constituting the left-hand image and the point 6 projects in the same manner the luminous rays 52 of the micro-filter constituting the right-hand image. The distance between the points 5 and 6 is chosen in such a way that the rays 51 are situated midway of the distance between two consecutive rays 52.

The construction lines of Fig. 7 show that from all the points of the segments 53 which are equidistant from the line 50, it is possible to see through the filter all the rays 51, whilst from all the points of the segments 54 which are equidistant it is possible to see all the rays 52. If a spectator has his left eye at a point of a segment 53 and his right eye at a point of a segment 54, he will have the stereoscopic vision.

If we join by lines both ends of each of the segments 53—54 to the point of convergence 3 of the slits of the filter 2, we will secure two series of zones in the form of elongated triangles having all their apexes at the point 3 and the long sides of the said triangles will be the lines of intersection of the plane 38 of the eyes with planes passing through the rays 51 and 52 of the screen and through the edges of the slits of the filter.

The result is that if one's eye is placed at a point of a triangle having for its base a segment 53 and observes the screen through the filter, all the rays 51 will be seen. Consequently it is only necessary that a spectator have his left eye within a triangle 53 and his right eye within a triangle 54 in order to have stereoscopic vision.

If now, the filter and the rays produced by the micro-filter on the screen are put in oscillation around their common point of convergence, it is obvious that all the triangular zones will remain motionless as indeed their common apex remains fixed and that their bases formed by the segments 53 and 54 are also fixed in view of the fact that those segments are equidistant and that the middle of two of the latter is in coincidence with the points of projection 5 and 6 which are fixed.

When the filter will be put into oscillation the spectator will continue to have the stereoscopic vision, but instead of seeing an image formed by rays, he will see a continuous image, as indeed the rays by moving on the motionless projected images will lighten successively all the portions of those images.

It will be understood that the invention is not restricted to the specific means described as an example to illustrate the manner in which it may be performed and that it must be considered as extending also to any modification falling within the scope of the appended claims.

What I claim is:

1. In the art of making cinematographic projections, in combination a screen, means to project a double series of pictures on the said screen, a "filter" immediately in front of the screen and cooperating therewith, the said filter being provided with a single series of slits, all of said slits converging toward a single point and being spaced from each other by non reflecting and opaque bands, and oscillating means to move the said filter in its own plane.

2. In the art of making cinematographic projections, in combination a screen, means to project a double series of pictures on the said screen, a filter cooperating with the said screen, the said filter being provided with substantially converging slits spaced from each other by opaque bands, a microfilter cooperating with the projecting means whereby the series of pictures which are to be projected through the filter are lighted along spaced lines or strips and means whereby the filter and microfilter are adapted to be oscillated synchronically.

3. In the art of making cinematographic projections, in combination a screen, means to project a double series of pictures on the said screen, a filter cooperating with the said screen, the said filter being provided with substantially converging slits spaced from each other by opaque bands, a plate of glass-like material the said plate being provided on one face with substantially converging concave grooves acting as a microfilter cooperating with the projecting means, whereby the series of pictures which are to be projected through the filter are lighted along spaced lines or strips, the said microfilter and filter being oscillated synchronically.

4. In the art of making cinematographic projections, in combination a screen, a double film, the said double film carrying two series of juxtaposed pictures, a projector cooperating with the said double film, a filter cooperating with the screen, the said filter being provided with slits spaced from each other by opaque bands, means for moving the said filter, and a microfilter cooperating with the projector, whereby the pictures carried by the film are lighted along spaced lines or strips before being projected on the screen through the slits of the moving filter.

5. In the art of making cinematographic projections, in combination a screen, a double film, the said double film carrying two series of juxtaposed pictures, a projector cooperating with the said double film, a filter placed in front of the screen, the said filter being provided with substantially converging slits spaced from each other by opaque bands, means whereby the said filter may be put in oscillation and a microfilter cooperating with the projector the said microfilter consisting of a glass like plate provided with substantially converging concave grooves and oscillating synchronically with the filter.

6. In the art of making cinematographic projections, in combination a screen, a source of light, a double film carrying two series of juxtaposed pictures, a projector, the said projector being provided with means whereby each series of pictures of the double film is projected separately on the screen, a microfilter or glass like surface provided with concave grooves, the said microfilter being located in the said projector between the source of light and the double film whereby the pictures carried by the double film are lighted along spaced lines or strips, and a filter placed in front of the screen, the said filter being provided with slits spaced from each other, the said filter and microfilter being moved synchronically.

7. In the art of making cinematographic projections, in combination a screen, a projector a double film carrying two series of juxtaposed pictures, a mirror arranged opposite the said screen and projector, means whereby the pictures carried by the double film are projected on the said mirror in the shape of luminous lines or strips and a filter moving in front of the screen, the said filter being provided with slits spaced from each other, whereby the pictures of one series of the double film are thrown on the screen by the mirror in the shape of luminous lines or strips inserted between two adjacent luminous lines or strips of the second series of pictures carried by the said double film.

8. In the art of making cinematographic projections in combination a screen, means to project a double series of pictures on said screens, a filter immediately in front of the screen and cooperating therewith, said filter having a single series of slits therethrough spaced from each other by opaque bands, all of said slits converging towards a point situated on the common line of intersection of the plane of the eyes of a spectator, of the filter and the screen, and oscillating means for moving the filter about the point of convergence of the slits in the filter.

9. In the art of making cinematographic projections in combination, a screen, means to project a double series of pictures on said screens, a filter immediately in front of the screen and cooperating therewith, said filter having a single series of slits therethrough spaced from each other by opaque bands, all of said slits converging towards a point, and operating means for moving the filter in its own plane about the point of convergence of the sides of the slits.

In testimony whereof I have affixed my signature.

EDMOND HENRI VICTOR NOAILLON.